United States Patent
Lyren

(10) Patent No.: US 10,757,523 B2
(45) Date of Patent: *Aug. 25, 2020

(54) EMOJI THAT INDICATES A LOCATION OF BINAURAL SOUND

(71) Applicant: Philip Scott Lyren, Bangkok (TH)

(72) Inventor: Philip Scott Lyren, Bangkok (TH)

(*) Notice: Subject to any disclaimer, the term of this patent is extended or adjusted under 35 U.S.C. 154(b) by 0 days.

This patent is subject to a terminal disclaimer.

(21) Appl. No.: 16/354,184

(22) Filed: Mar. 15, 2019

(65) Prior Publication Data
US 2019/0246233 A1 Aug. 8, 2019

Related U.S. Application Data

(63) Continuation of application No. 15/889,185, filed on Feb. 5, 2018, now Pat. No. 10,306,395.

(51) Int. Cl.
| | | |
|---|---|---|
| *H04S 7/00* | (2006.01) | |
| *H04S 3/00* | (2006.01) | |
| *G09G 5/37* | (2006.01) | |
| *G06F 3/16* | (2006.01) | |
| *G06T 13/40* | (2011.01) | |
| *H04M 1/725* | (2006.01) | |
| *G09G 5/10* | (2006.01) | |
| *G06F 3/147* | (2006.01) | |
| *G09G 5/38* | (2006.01) | |

(52) U.S. Cl.
CPC ............ *H04S 7/303* (2013.01); *G06F 3/147* (2013.01); *G06F 3/165* (2013.01); *G06T 13/40* (2013.01); *G09G 5/10* (2013.01); *G09G 5/37* (2013.01); *H04M 1/72547* (2013.01); *H04S 3/008* (2013.01); *G09G 5/38* (2013.01); *G09G 2354/00* (2013.01); *G09G 2380/06* (2013.01); *H04S 2400/11* (2013.01); *H04S 2420/01* (2013.01)

(58) Field of Classification Search
CPC . H04S 7/308; H04S 5/00; H04S 7/303; H04S 3/008; H04S 2400/11; H04S 2420/01; G06F 3/0481; G06F 3/147; G06F 3/165; H04R 5/02; G06T 13/40; G09G 5/10; G09G 5/37; G09G 5/38; G09G 2354/00; G09G 2380/06; H04M 1/72547
See application file for complete search history.

Primary Examiner — Haoshian Shih

(57) ABSTRACT

A smartphone displays an emoji that when activated plays sound that externally localizes in binaural sound to the listener. The emoji includes an indication that shows a location where the sound will externally localize as the binaural sound away from a head of the listener when the listener activates the emoji.

20 Claims, 7 Drawing Sheets

Display a graphical representation with an indication visually informing a listener that sound associated with the graphical representation will externally localize as binaural sound to the listener when the sound plays to the listener.
100

Play the sound associated with the graphical representation as binaural sound that externally localizes away from the head of the listener.
110

Figure 1

Display a graphical representation with an indication visually informing a listener a location where binaural sound associated with the graphical representation will externally localize as binaural sound to the listener.
200

Play the sound associated with the graphical representation as binaural sound that externally localizes away from the head of the listener to the location indicated by the indication.
210

Figure 2

Display a graphical representation with an indication visually informing a listener to wear headphones or earphones so the listener knows in advance that sound associated with the graphical representation will externally localize as binaural sound to the listener when the sound plays to the listener.
300

Play the sound associated with the graphical representation as binaural sound that externally localizes away from the head of the listener.
310

Figure 3

EMOJI THAT INDICATES A LOCATION OF BINAURAL SOUND

BACKGROUND

Three-dimensional (3D) sound localization offers people a wealth of new technological avenues to not merely communicate with each other but also to communicate with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

BRIEF DESCRIPTION OF THE DRAWINGS

FIG. 1 is a method to display a graphical representation that shows sound associated with the graphical representation will externally localize as binaural sound to a listener in accordance with an example embodiment.

FIG. 2 is a method to display a graphical representation that shows a listener where binaural sound will externally localize to the listener in accordance with an example embodiment.

FIG. 3 is a method to display a graphical representation that informs a listener to wear headphones or earphones before listening to binaural sound in accordance with an example embodiment.

SUMMARY

Figure 4:
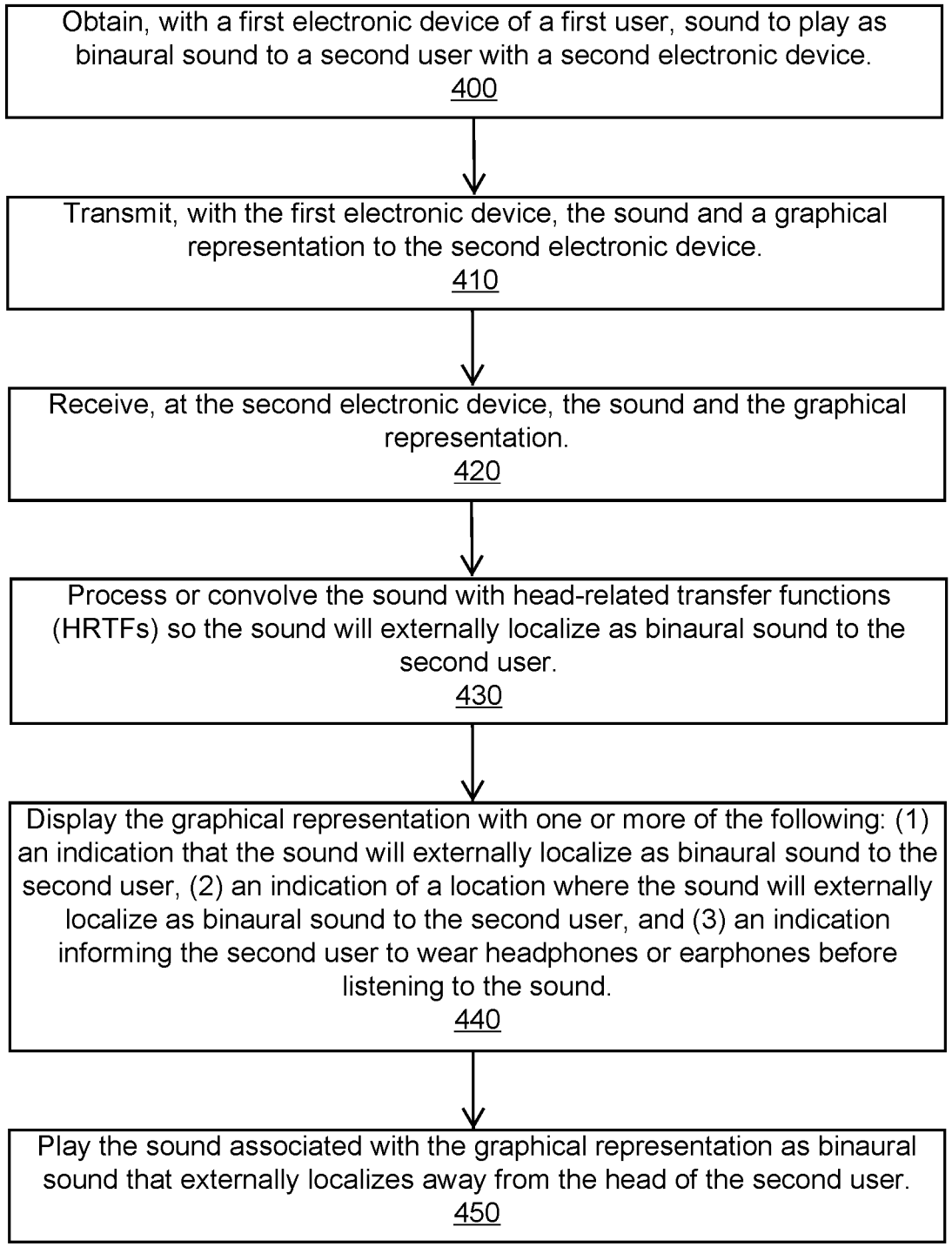
FIG. 4 is a method to provide one or more indications of binaural sound with a graphical representation during an electronic communication between two or more users in accordance with an example embodiment.

One example embodiment is a method or apparatus that includes graphical representations that when activated play sound in binaural sound to a listener. When displayed to the listener, the graphical representations show one or more of an indication that the sound will externally localize as binaural sound to the listener, an indication of a location where the binaural sound will externally localize to the listener, and an indication that instructs the listener to wear headphones or earphones in order to hear the binaural sound.

Other example embodiments are discussed herein.

DETAILED DESCRIPTION

Binaural sound or three-dimensional (3D) sound externally localizes away from a head of the listener, unlike stereo or mono sound that localizes inside the head of the listener. Thus, when a listener hears binaural sound, a source or location of the sound occurs outside the head of the listener even though this location may be in empty space or space not occupied with a sound speaker.

Binaural sound has many technical challenges and problems, especially when users exchange binaural sound during an electronic communication. Example embodiments offer solutions to these challenges and problems.

One problem with binaural sound is the listener during an electronic communication with another person may not know that the sound being provided from the other person is binaural sound as opposed to being stereo sound or mono sound. If the listener is not wearing headphones or earphones, then the binaural sound will not externally localize to the listener and hence the effect of binaural sound is lost. In order to externally localize binaural sound, the listener must wear headphones, earphones, or the like since binaural sound requires two speakers placed at the ears of the listener. Alternatively, the binaural sound must be provided to the listener through multiple speakers that provide a sweet spot where the binaural sound can be heard.

Consider an example in which two users engage in an electronic communication and exchange sound clips in binaural sound, such as voice messages, emojis that play binaural sound when activated, voices in binaural sound, etc. For example, a first user sends a second user an emoji that when activated plays a voice in binaural sound to the second user. When the second user receives the emoji, he or she is not aware that the voice is in binaural sound and hence does not wear headphones or earphones. When the second user activates the emoji and hears the voice, the voice does not externally localize and the effects of binaural sound are lost.

Example embodiments solve this problem and others. By way of example, an example embodiment provides a graphical representation with an indication that the sound the listener will hear is in binaural sound. This indication will inform the listener to wear headphones or earphones before listening to the sound from the graphical representation.

Another problem with binaural sound is that the listener does not know in advance a location where the binaural sound will externally localize. Even if the listener knows the sound is binaural sound, the listener would not know where this sound will externally localize with respect to the listener. For example, the listener cannot determine in advance whether the binaural sound will localize behind the listener, in front of the listener, to a right side of the listener, to a left side of the listener, etc. This situation can confuse the listener or surprise the listener since binaural sound is indistinguishable from naturally occurring sound in an environment of the listener.

Consider an example in which two users engage in an electronic communication. A first user records a greeting that says "Hello. How are you?" and sends this greeting as a 3D emoji to a second user. When the second user activates the emoji, the voice of the first person originates next to the second user about one to two meters away. The voice is so realistic that the second user believes the first user is standing and talking in the same room. The second user is confused as he turns to where the voice of the first user originated but no one is there.

Example embodiments solve this problem and others. By way of example, an example embodiment provides a graphical representation with an indication of a location where binaural sound will externally localize to the listener before the sound actually externally localizes. In this way, the listener knows in advance a location of a source or origin of the binaural sound before he or she hears it.

FIG. 1 is a method to display a graphical representation that shows sound associated with the graphical representation will externally localize as binaural sound to a listener in accordance with an example embodiment.

Block 100 states display a graphical representation with an indication visually informing a listener that sound associated with the graphical representation will externally localize as binaural sound to the listener when the sound plays to the listener.

Graphical representations include, but are not limited to, emoji, emoticons, animoji, icons, folders, documents, files, text or words, pictures, images, and other visible indicia that display on, thru, or with an electronic device. Furthermore, these graphical representations can be two-dimensional (2D), three-dimensional (3D), virtual reality (VR) images, augmented reality (AR) images, static or non-moving, moving, and other types of images.

The indication enables a user to see that sound associated with or corresponding to the graphical representation will externally localize as binaural sound. In this way, the user knows in advance that the sound will externally localize as binaural sound as opposed to hearing the sound as stereo sound or mono sound that internally localizes inside a head of the user. Before the user actually hears the sound associated with the graphical representation, the user knows that the sound is binaural sound and intended to externally localize outside of the head of the user.

The indication can also informs or instructs the user to wear headphones, earbuds, earphones, or another electronic device that provides binaural sound. Binaural sound cannot accurately localize outside a head of the listener unless the listener wears such an electronic device. Since the listener knows in advance that the sound is binaural sound, he or she will don headphones or earphones before listening to the sound if the listener is not already wearing such a device.

The indication can be part of the graphical representation itself. For example, the indication forms part of the structure or body of the graphical representation. The indication can also attach to the graphical representation or touch, supplement, compliment, or complete the graphical representation.

Alternatively, the indication is separate from or apart from the graphical representation. For example, the indication and the graphical representation are two different and/or separate objects that are simultaneously displayed to the user.

Figure 5A:
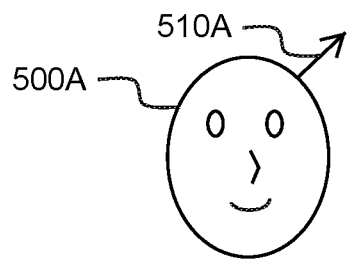
FIG. 5A is a graphical representation with an indication of binaural sound in accordance with an example embodiment.

By way example, the indication is or uses color, light, brightness, shading, or another enhancement or indication to visibly show the user that sound associated with the graphical representation will be played in and heard by the listener as binaural sound. Further examples of indications are shown in FIGS. 5A-5R.

Block 110 states play the sound associated with the graphical representation as binaural sound that externally localizes away from the head of the listener.

In an example embodiment, a sound file, sound clip, streaming sound, a recording, or other type of sound associates with or corresponds to a graphical representation. Binaural sound plays to the listener when the graphical representation activates.

In an example embodiment, a user, a listener, a program or software application, or an electronic device activates the graphical representation and/or causes the binaural sound to play to the listener.

For example, the listener interacts with a user interface and provides a command or instruction to play the sound upon receiving the graphical representation. For instance, the first user performs one or more actions that include, but are not limited to, clicking or activating an icon, emoji, graphical representation, or other indicia that represents a sound clip, sound file, streaming sound, or recording, selecting the sound from a menu (such as a dropdown menu), selecting the sound from a folder or file (such as a folder or file being displayed to the first user), providing a body gesture (such as a hand gesture or hand movement indicating a desire to play the sound), providing head movement or eye movement (such as the listener moving his or her head in a certain direction or pattern to indicate selection of the sound), providing a voice command (such as the listener speaking an instruction at a natural language user interface), or taking another action to have the sound played to the listener.

As another example, the sound automatically plays. For instance, the sound plays when the listener receives the graphical representation, opens the software program providing the graphical representation, or views the graphical representation on a display.

As another example, the sound plays when a sender of the sound (e.g., another user in an electronic communication with the listener) activates the sound or designates when the sound plays.

Binaural sound is provided to the listener through one or more electronic devices including, but not limited to, one or more of headphones, earphones, earbuds, bone conduction devices, or other electronic devices with speakers at, in, or near the ears of the listener. Binaural sound can be processed for crosstalk cancellation and provided through speakers separate or away from the listener (e.g., dipole stereo speakers). Electronic devices in communication with headphones, earphones, and earbuds can provide binaural sound to the listener (e.g., a smartphone in wireless communication with earphones).

Various types of electronic devices can include or be in communication with speakers to provide binaural sound to listeners. Examples of these electronic devices include, but are not limited to, wearable electronic glasses, smartphones, head mounted displays (HMDs), optical head mounted displays (OHMDs), wearable electronic devices (WEDs), portable electronic devices (PEDs), handheld portable electronic devices (HPEDs), laptop computers, tablet computers, desktop computers, and other electronic devices.

From the point-of-view of the listener, the sound originates or emanates from an object, point, area, or direction. This location for the origin of the sound is the sound localization point (SLP). By way of example, the SLP can be an actual point in space (e.g., an empty point in space 1-2 meters away from the head of the listener) or a point on or at a physical or virtual object (e.g., a mouth or head of an augmented reality (AR) or virtual reality (VR) image). The SLP does not have to be so precise since humans are not always able to localize sound to a particle point. As such, the SLP can also be a specific or general area (e.g., a location next to and on the right side of the listener) or a specific or general direction from where the sound originates to the listener (e.g., a location several meters behind the listener).

When binaural sound is provided to the listener, the listener will hear the sound as if it originates from the sound source, the source of sound, or the SLP. The sound, however, does not originate from the sound source since the sound source or SLP may be an inanimate object with no electronics or an animate object with no electronics. Alternatively, the sound source or SLP has electronics but does not have the capability to generate sound (e.g., the sound source has no speakers or sound system). As yet another example, the sound source or SLP has speakers and the ability to provide sound but is not providing sound to the listener. In each of these examples, the listener perceives the sound to originate from the sound source or SLP, but the sound source or SLP does not produce the sound. Instead, the sound is altered or convolved and provided to the listener so the sound appears to originate from the sound source or SLP.

In an example embodiment, at least a portion of the sound associated with, corresponding to, or provided from the graphical representation externally localizes away from the head of the listener in empty space (e.g., where no physical or tangible object exists) or occupied space. For example, the sound externally localizes proximate or near the listener, such as localizing within a few meters of the listener. For instance, the SLP where the listener localizes the sound is stationary or fixed in space (e.g., fixed in space with respect to the user, fixed in space with respect to an object in a room, fixed in space with respect to an electronic device, fixed in space with respect to another object or person).

Consider an example in which two users message and/or talk to each other in an electronic communication via a mobile messaging application. A HPED of the first user sends a HPED of the second user a graphical representation, here a 3D sound emoji. This emoji appears on the display of the HPED of the second user as an animated or cartoon character. This character wears headphones that flash or change brightness. When the second user sees the headphones, he or she knows the emoji is informing the second user to wear headphones or earphones before listening to the sound associated with the emoji. The second user dons headphones, and the emoji (here the character) speaks. A voice of the emoji externally localizes as binaural sound to the listener at a SLP outside of the head of the second user. Once the user dons the headphones, the headphones disappear since this indication served its function to inform the user that sound would be binaural sound.

FIG. 2 is a method to display a graphical representation that shows a listener where binaural sound will externally localize to the listener in accordance with an example embodiment.

Block 200 states display a graphical representation with an indication visually informing a listener a location where binaural sound associated with the graphical representation will externally localize to the listener.

The indication shows the user the location of the sound source or SLP where the binaural sound will originate to the listener. This location can be a physical or virtual object, a point, an area, or a direction. Further, the indication can provide the location with a precise or general direction of the SLP and/or a precise or general distance to the SLP.

In an example embodiment, the indication provides a precise, exact, or clearly identifiable location where the sound will originate to the listener. For example, the indication displays, provides, or points to a SLP that is a precise point or area that the listener can identify or see. For example, the indication indicates a physical or virtual object where the sound will externally localize. When the listener hears the sound, the sound indeed originates from the physical or virtual object identified by the identification.

In an example embodiment, the indication provides a general point, general area, or direction where the sound will originate to the listener. For example, the indication provides a heading or direction (e.g., North, South, East, West, etc.). As another example, the indication provides general direction or area (e.g., sound will originate to your left, to your right, in front of you, over there, behind you, etc.).

The indication can also provide a precise or general distance to the location. For example, upon seeing the indication, the listener knows the SLP will be one meter away or two meters away. As another example, upon seeing the indication, the listener knows the SLP will be near to the listener (e.g., within 3 meters) or far from the listener (e.g., greater than five meters, greater than 10 meters, or farther). Alternatively, the indication identifies whether the SLP will be "near-field" (which is sound that originates from a location that is within one meter from a head of the listener) or "far-field" (which is sound that originates from a location that is greater than one meter from the head of the listener).

As another example, the listener knows the specific direction from where the sound originates but not the precise distance to the sound. As another example, the listener knows a specific distance but not the location. For instance, the listener hears a voice and knows the voice originates about 2 meters behind the left side of the head of the listener.

By way of example, the SLP can be an actual point in space (e.g., an empty point in space 1-2 meters away from the head of the listener) or a point on a physical or virtual object (e.g., a mouth or head of an augmented reality (AR) or virtual reality (VR) image). The SLP does not have to be so precise since humans are not always able to localize sound to a particle point. As such, the SLP can also be a general area (e.g., a location next to and on the right side of the listener) or a general direction from where the sound originates to the listener (e.g., a location several meters behind the listener).

Block 210 states play the sound associated with the graphical representation as binaural sound that externally localizes away from the head of the listener to the location indicated by indication.

The listener hears the sound at the location that coincides with or matches with the location provided by the indication. In this way, the listener knows in advance where the binaural sound will externally localize to the listener before the listener hears the sound.

Consider an example in which the graphical representation is an emoji that includes a talking animated animal head or human head. When a listener clicks on or activates the emoji, the head talks and the listener hears the voice as binaural sound that externally localizes about one meter away from the listener. The emoji includes an indication showing that this voice will externally localize in front of and to the right of the head of the listener. For instance, the voice is convolved with head-related transfer functions (HRTFs) having spherical coordinates (distance r=1.0 m, elevation $\phi=0°$, azimuth $\theta=30°$). The listener activates the emoji and hears the voice originate from spherical coordinates (1.0, 0°, 30°) which coincides with the location indicated by the indication.

Consider another example in which the graphical representation is an emoji that displays on a HPED of the listener. The emoji appears in the center of the display of the HPED, and a flashing dot (or other flashing indicia) appears above and to the left of the emoji. This dot indicates the location where the binaural sound will localize with respect to the listener. In this example, the emoji represents or symbolizes the head of the listener, and the dot represents a relative location where the SLP will be. As shown on the display of the HPED, the SLP (shown as the flashing dot) is in front of and to the left of the emoji. As such, the SLP for the sound that the listener will hear will also occur in front of and to the left of the head of the listener.

FIG. 3 is a method to display a graphical representation that informs a listener to wear headphones or earphones before listening to binaural sound in accordance with an example embodiment.

Block 300 states display a graphical representation with an indication visually informing a listener to wear headphones or earphones so the listener knows in advance that sound associated with the graphical representation will externally localize as binaural sound to the listener when the sound plays to the listener.

The indication visually informs the listener to wear or don headphones, earphones, or another electronic device that can provide binaural sound to the listener before listening to the sound. In this way, the effects of externally localization are not lost, and the listener is able to enjoy 3D sound as opposed to hearing the sound as stereo sound or mono sound.

By way of example, the indication uses one or more of color, light, shading, brightness, or flashing to inform the listener to wear headphones or earphones before listening to the sound. As another example, the indication uses words or text to inform the user. For instance, the indication includes the words "headphones" or an acronym or symbol (e.g., "HP" or "3D") to signify the listener should wear headphones or earphones. As another example, the graphical representation includes a sign, symbol, emblem, artwork, image, or other indicia showing the listener to wear headphones or earphones. For instance, the graphical representation includes a head wearing headphones, about to wear headphones, or putting on headphones. Movements or actions of the graphical representation instruct the listener on what movements or actions the listener should do as well (e.g., movements of the graphical representation donning headphones shows the listener to don headphones).

Block 310 states play the sound associated with the graphical representation as binaural sound that externally localizes away from the head of the listener.

As discussed in connection with block 110, the listener hears the sound as binaural sound that externally localizes away from the head of the listener.

FIG. 4 is a method to provide one or more indications of binaural sound with a graphical representation during an electronic communication between two or more users in accordance with an example embodiment.

Block 400 states obtain, with a first electronic device of a first user, sound to play as binaural sound to a second user with a second electronic device.

By way of example, a computer or electronic device generates the sound (computer-generated sound), or microphones capture and record the sound to be sent. For example, one or more microphones capture the sound as mono sound or stereo sound when the first user speaks a message to the second user. As another example, the first electronic device or a server in communication with the first electronic device includes a plurality pre-recorded or previously generated sounds.

The sound can be stored in memory of an electronic device, obtained from memory of an electronic device (such as a computer or server), and/or transmitted or streamed over one or more networks.

Consider an example in which the first electronic device executes a mobile software messaging application that includes hundreds or thousands of sound clips or sound files. The first electronic device obtains or has access to these sound clips or sound files and can send them to other users of the mobile software messaging application.

Consider an example in which the first electronic device obtains the sound when the first user speaks into microphones in the first electronic device or in communication with the first electronic device. The microphones records the voice of the first user as he or she records a message or sound to be played to the second user.

Block 410 states transmit, with the first electronic device, the sound and a graphical representation to the second electronic device.

The first electronic device transmits the sound and a graphical representation associated with or corresponding to the sound over one or more wired or wireless networks (e.g., a cellular network, the internet, etc.). For example, the first electronic device includes a wireless transmitter/receiver that sends the sound and graphical representation.

Consider an example in which the first user commands or instructs the sound clip to play to the second user during an electronic communication between the first and second users. In response to this command or instruction, the first electronic device transmits the sound clip and a 3D moving emoji to the second electronic device.

In another example embodiment, a server or another electronic device transmits the sound and/or graphical representation to the second electronic device. Consider an example in which the first and second users talk or message each other with a mobile messaging software application. The application executes on the electronic devices and one or more servers. When the first user clicks on a 3D sound emoji, this action causes one of the servers to transmit the 3D emoji and sound to the second electronic device.

Block 420 states receive, at the second electronic device, the sound and the graphical representation.

The second electronic device receives the sound and the graphical representation from the first electronic device or another electronic device (e.g., a server) in communication with the first electronic. For example, the second electronic device includes a wireless transmitter/receiver that receives the sound and graphical representation over one or more networks.

Block 430 states process or convolve the sound with head-related transfer functions (HRTFs) so the sound will externally localize as binaural sound to the second user.

For example, a processor (such as a DSP) processes or convolves the sound with one or more of head-related transfer functions (HRTFs), head-related impulse responses (HRIRs), room impulse responses (RIRs), room transfer functions (RTFs), binaural room impulse responses (BRIRs), binaural room transfer functions (BRTFS), interaural time delays (ITDs), interaural level differences (ILDs), and a sound impulse response.

One example embodiment processes or convolves the sound with the HRTFs before the electronic communication commences or before a point in time when the sound is requested for play during the electronic communication. For example, process the sound before the graphical representation is activated. This expedites playing of the sound to the listener since the listener does not have to wait while a processor processes or convolves the sound into binaural sound. Furthermore, the processor (such as the DSP) can be devoted to other tasks instead of convolving the sound into binaural sound.

Another example embodiment processes or convolves the sound during the electronic communication or at a point in time when the sound is requested for play in the electronic communication. For example, the DSP convolves the sound when the graphical representation activates.

Sound includes, but is not limited to, one or more of stereo sound, mono sound, binaural sound, computer-generated sound, sound captured with microphones, and other sound. Furthermore, sound includes different types including, but not limited to, music, background sound or background noise, human voice, computer-generated voice, and other naturally occurring or computer-generated sound.

When the sound is recorded or generated in mono sound or stereo sound, convolution changes the sound to binaural sound. For example, one or more microphones record a human person speaking in mono sound or stereo sound, and a processor processes this sound with filters to change the sound into binaural sound.

The processor or sound hardware processing or convolving the sound can be located in one or more electronic devices or computers including, but not limited to, headphones, smartphones, tablet computers, electronic speakers, head mounted displays (HMDs), optical head mounted displays (OHMDs), electronic glasses (e.g., glasses that provide augmented reality (AR)), servers, portable electronic devices (PEDs), handheld portable electronic devices (HPEDs), wearable electronic devices (WEDs), and other portable and non-portable electronic devices. These electronic devices can also be used to execute example embodiments.

In one example embodiment, the DSP is located in the electronic device of the second user. In other example embodiments, the DSP is located in other electronic devices, such as a server or in the first electronic device of the first user.

The DSP processes or convolves stereo sound or mono sound with a process known as binaural synthesis or binaural processing to provide the sound with sound localization cues (ILD, ITD, and/or HRTFs) so the listener externally localizes the sound as binaural sound or 3D sound.

HRTFs can be obtained from actual measurements (e.g., measuring HRIRs and/or BRIRs on a dummy head or human head) or from computational modeling. HRTFs can also be general HRTFs (also known as generic HRTFs) or customized HRTFs (also known as individualized HRTFs). Customized HRTFs are specific to an anatomy of a particular listener. Each person has unique sets or pairs of customized HRTFs based on the shape of the ears or pinnae, head, and torso.

An example embodiment models the HRTFs with one or more filters, such as a digital filter, a finite impulse response (FIR) filter, an infinite impulse response (IIR) filter, etc. Further, an ITD can be modeled as a separate delay line.

When the binaural sound is not captured (e.g., on a dummy head or human head), the captured sound is convolved with sound localization information (SLI). This information includes one or more of HRTFs, HRIRs, BRTFs, BRIRs, ILDs, ITDs, and/or other information discussed herein. By way of example, SLI are retrieved, obtained, or received from memory, a database, a file, an electronic device (such as a server, cloud-based storage, or another electronic device in the computer system or in communication with a PED providing the sound to the user through one or more networks), etc. Instead of being retrieved from memory, this information can also be calculated in real-time.

A central processing unit (CPU), processor (such as a DSP), or microprocessor processes and/or convolves the sound with the SLI, such as a pair of head related transfer functions (HRTFs), ITDs, and/or ILDs so that the sound will localize to a zone, area, or sound localization point (SLP). For example, the sound localizes to a specific point (e.g., localizing to point $(r, \theta, \phi)$) or a general location or area (e.g., localizing to far-field location $(\theta, \phi)$ or near-field location $(\theta, \phi)$). As an example, a lookup table that stores a set of HRTF pairs includes a field/column that specifies the coordinates associated with each pair, and the coordinates indicate the location for the origination of the sound. These coordinates include a distance (r) or near-field or far-field designation, an azimuth angle ($\theta$), and/or an elevation angle ($\phi$).

The complex and unique shape of the human pinnae transforms sound waves through spectral modifications as the sound waves enter the ear. These spectral modifications are a function of the position of the source of sound with respect to the ears along with the physical shape of the pinnae that together cause a unique set of modifications to the sound called head related transfer functions or HRTFs. A unique pair of HRTFs (one for the left ear and one for the right ear) can be modeled or measured for each position of the source of sound with respect to a listener as the customized HRTFs.

A HRTF is a function of frequency (f) and three spatial variables, by way of example $(r, \theta, \phi)$ in a spherical coordinate system. Here, r is the radial distance from a recording point where the sound is recorded or a distance from a listening point where the sound is heard to an origination or generation point of the sound; $\theta$ (theta) is the azimuth angle between a forward-facing user at the recording or listening point and the direction of the origination or generation point of the sound relative to the user; and $\phi$ (phi) is the polar angle, elevation, or elevation angle between a forward-facing user at the recording or listening point and the direction of the origination or generation point of the sound relative to the user. By way of example, the value of (r) can be a distance (such as a numeric value) from an origin of sound to a recording point (e.g., when the sound is recorded with microphones) or a distance from a SLP to a head of a listener (e.g., when the sound is generated with a computer program or otherwise provided to a listener).

When the distance (r) is greater than or equal to about one meter (1 m) as measured from the capture point (e.g., the head of the person) to the origination point of a sound, the sound attenuates inversely with the distance. One meter or thereabout defines a practical boundary between near-field and far-field distances and corresponding HRTFs. A "near-field" distance is one measured at about one meter or less; whereas a "far-field" distance is one measured at about one meter or more. Example embodiments are implemented with near-field and far-field distances.

The coordinates for external sound localization can be calculated or estimated from an interaural time difference (ITD) of the sound between two ears. ITD is related to the azimuth angle according to, for example, the Woodworth model that provides a frequency independent ray tracing methodology. The coordinates (r, θ, φ) for external sound localization can also be calculated from a measurement of an orientation of and a distance to the face of the person when a head related impulse response (HRIR) is captured.

The coordinates can also be calculated or extracted from one or more HRTF data files, for example by parsing known HRTF file formats, and/or HRTF file information. For example, HRTF data is stored as a set of angles that are provided in a file or header of a file (or in another predetermined or known location of a file or computer readable medium). The data can include one or more of time domain impulse responses (FIR filter coefficients), filter feedback coefficients, and an ITD value. This information can also be referred to as "a" and "b" coefficients. By way of example, these coefficients are stored or ordered according to lowest azimuth to highest azimuth for different elevation angles. The HRTF file can also include other information, such as the sampling rate, the number of elevation angles, the number of HRTFs stored, ITDs, a list of the elevation and azimuth angles, a unique identification for the HRTF pair, and other information. The data can be arranged according to one or more standard or proprietary file formats, such as AES69, and extracted from the file.

The coordinates and other HRTF information are calculated or extracted from the HRTF data files. A unique set of HRTF information (including r, θ, φ) is determined for each unique HRTF.

The coordinates and other HRTF information are also stored in and retrieved from memory, such as storing the information in a look-up table. The information is quickly retrieved to enable real-time processing and convolving of sound using HRTFs and hence improves computer performance of execution of binaural sound.

The SLP represents a location where a person will perceive an origin of the sound. For an external localization, the SLP is away from the person (e.g., the SLP is away from but proximate to the person or away from but not proximate to the person). The SLP can also be located inside the head of the person (e.g., when the sound is provided as mono sound or stereo sound). Sound can also switch between externally localizing and internally localizing, such as appearing to move and pass through a head of a listener.

SLI can also be approximated or interpolated based on known data or known SLI, such as SLI for other coordinate locations. For example, a SLP is desired to localize at coordinate location (2.0 m, 0°, 40°), but HRTFs for the location are not known. HRTFs are known for two neighboring locations, such as known for (2.0 m, 0°, 35°) and (2.0 m, 0°, 45°), and the HRTFs for the desired location of (2.0 m, 0°, 40°) are approximated from the two known locations. These approximated HRTFs are provided to convolve sound to localize at the desired coordinate location (2.0 m, 0°, 40°).

Sound is convolved either directly in the time domain with a finite impulse response (FIR) filter or with a Fast Fourier Transform (FFT). For example, an electronic device convolves the sound to one or more SLPs using a set of HRTFs, HRIRs, BRIRs, or RIRs and provides the person with binaural sound.

In an example embodiment, convolution involves an audio input signal and one or more impulse responses of a sound originating from various positions with respect to the listener. The input signal is a limited length audio signal (such as a pre-recorded digital audio file or sound clip) or an ongoing audio signal (such as sound from a microphone or streaming audio over the Internet from a continuous source). The impulse responses are a set of HRIRs, BRIRs, RIRs, etc.

Convolution applies one or more FIR filters to the input signals and convolves the input signals into binaural audio output or binaural stereo tracks. For example, the input signals are convolved into binaural audio output that is specific or individualized for the listener based on one or more of the impulse responses to the listener.

The FIR filters are derived binaural impulse responses. Alternatively or additionally, the FIR filters are obtained from another source, such as generated from a computer simulation or estimation, generated from a dummy head, retrieved from storage, computed based on known impulse responses captured from people, etc. Further, convolution of an input signal into binaural output can include sound with one or more of reverberation, single echoes, frequency coloring, and spatial impression.

Processing of the sound also includes calculating and/or adjusting an interaural time difference (ITD), an interaural level difference (ILD), and/or other aspects of the sound in order to alter the cues and artificially alter the point of localization. Consider an example in which the ITD is calculated for a location (θ, φ) with discrete Fourier transforms (DFTs) calculated for the left and right ears. The ITD is located at the point for which the function attains its maximum value, known as the argument of the maximum or arg max as follows:

$$ITD = \arg\max(\tau) \sum_n d_{l,\theta,\phi}(n) \cdot d_{r,\theta,\phi}(n+\tau).$$

Subsequent sounds are filtered with the left HRTF, right HRTF, and/or ITD so that the sound localizes at (r, θ, φ). Such sounds include filtering stereo and monaural sound to localize at (r, θ, φ). For example, given an input signal as a monaural sound signal s(n), this sound is convolved to appear at (θ, φ) when the left ear is presented with:

$s_l(n) = s(n-\text{ITD}) \cdot d_{l,\theta,\phi}(n);$ and the right ear is presented with:

$s_r(n) = s(n) \cdot d_{r,\theta,\phi}(n).$

Consider an example in which a dedicated digital signal processor (DSP) executes frequency domain processing to generate real-time convolution of monophonic sound to binaural sound.

By way of example, a continuous audio input signal x(t) is convolved with a linear filter of an impulse response h(t) to generate an output signal y(t) as follows:

$$y(\tau) = x(\tau) \cdot h(\tau) = \int_0^\infty x(\tau-t) \cdot h(t) \cdot dt.$$

This reduces to a summation when the impulse response has a given length N and the input signal and the impulse response are sampled at t=iDt as follows:

$$y(i) = \sum_{j=0}^{N-1} x(i-j) \cdot h(j).$$

Execution time of convolution further reduces with a Fast Fourier Transform (FFT) algorithm and/or Inverse Fast Fourier Transform (IFFT) algorithm.

Consider another example of binaural synthesis in which recorded or synthesized sound is filtered with a binaural impulse response (e.g., HRIR or BRIR) to generate a binaural output sound to the person. The input sound is preprocessed to generate left and right audio streams that are mapped to one or more sound sources or sound localization points (known as SLPs). These streams are convolved with a binaural impulse response for the left ear and the right ear to generate the left and right binaural output sound signal. The output sound signal is further processed depending on a final destination. For example, a cross-talk cancellation algorithm is applied to the output sound signal when it will be provided through loudspeakers or applying artificial binaural reverberation to provide 3D spatial context to the sound.

Block 440 states display the graphical representation with one or more of the following: (1) an indication that the sound will externally localize as binaural sound to the second user, (2) an indication of a location where the sound will externally localize as binaural sound to the second user, and (3) an indication informing the second user to wear headphones or earphones before listening to the sound.

The graphical representation displays one or more indications discussed herein in accordance with example embodiments. These indications include those discussed in connection with FIGS. 5A-5R.

Block 450 states play the sound associated with the graphical representation as binaural sound that externally localizes away from the head of the second user.

The sound plays to the listener as binaural sound that externally localizes away from or outside of the head of the listener. For example, headphones or earphones provide this sound at SLPs discussed herein.

FIGS. 5A-5R show a plurality of graphical representations with one or more indications in accordance with example embodiments. By way of example, the graphical representations 500A-500R are shown as faces, such as a face of an emoji, emoticon, etc. Such faces can have many shapes and forms, such as human faces, cartoon character faces, animal faces, animated faces, etc.

Example embodiments are not limited to graphical representations that include faces, such as those shown in FIGS. 5A-5R. Graphical representations can have many sizes, shapes, and forms (e.g., people, faces, characters, animals, and objects).

Furthermore, these graphical representations are shown as two-dimensional but can also be three-dimensional (3D). Further, the graphical representations can be static, such as a 2D or 3D emoji that do not move or change facial expressions. Alternatively, the graphical representations can be dynamic, such as 2D or 3D emoji that move, talk, change facial expressions, rotate, etc. Further yet, graphical representations in accordance with example embodiments can be presented as AR images and VR images.

The graphical representations 500A-500R include or are associated with a sound, such as a sound clip, a sound file, a recorded voice message, streaming audio, etc. The sound can play for a short period of time (e.g., less than one second, one second, two seconds, etc.). For example, the sound is a voice saying "Hello" or "Hahahaha" or "Thank you" or another short audio message. As another example, the sound is a computer-generated "Beep" or phone ringing or explosion sound. The sound can play for longer periods of time (e.g., ten seconds, thirty seconds, one minute, several minutes, etc.). For example, the sound is a recorded message from a user during an electronic communication between two users.

By way of example, the sound plays when the listener activates the graphical representation or another action occurs that initiates or activates playing of the sound. For example, a first user sends a second user an emoji shaped like a heart. This heart appears on a display of an electronic device of the second user. When the second user clicks on the heart, a voice in binaural sound says "I love you" to the second user.

With example embodiments, the graphical representations can represent or symbolize the listener or source of sound (depending on what instructions or understandings are provided to the listener and/or users). The graphical representations and indications are displayed to the listener on a display of a WED, PED, HPED, HMD, or other electronic device discussed herein. The electronic device and display are not shown in FIGS. 5A-5R for ease of illustration. Further, these figures are shown from the point-of-view of the listener looking at the display and/or interacting with the electronic device.

FIG. 5A shows a graphical representation 500A with an indication 510A shown as an arrow or pointer. One end of the arrow connects to the head of the graphical representation, and another end of the arrow points to a location where binaural sound will externally localize to the listener. Indication 510A points upward and to one side of the face of the graphical representation. This location shows the listener where the binaural sound will externally localize to the listener when the binaural sound plays to the listener.

Consider an example in which the graphical representation 500A displays on a display in front of the listener and represents a person or character that will talk to the listener. For example, the listener holds a smartphone or wears a HMD or WED, and the display shows the graphical representation 500A in front of the face of the listener. In this instance, the arrow points to a location in space that is upward and to the right of the listener. When the listener activates the graphical representation, the sound externally localizes to the location indicated with the indication 510A (here, upward and to the right of the face of the listener).

Consider an example in which the arrow is colored (e.g., blue or another color) and/or flashes or changes brightness. When users sees this arrow, they know that sound associated with the corresponding graphical representation will externally localize as binaural sound. This arrow appears on other emoji or emoticons. Users recognize the arrow as an indication or message that the sound will be in binaural sound.

The indications can thus serve as a way to visually inform users that the sound associated with the graphical representation will be binaural sound. Users learn the recognize the indication as a symbol for binaural sound. When a listener sees the arrow, he or she immediately knows in advance that the sound will be binaural sound and externally localize, as opposed to mono sound or stereo sound that internally localizes inside a head of the listener.

Figure 5B:
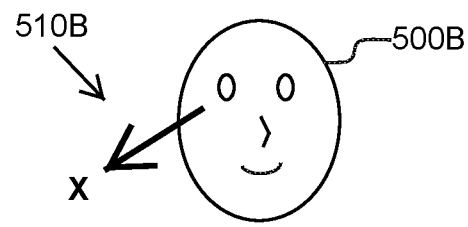
FIG. 5B is a graphical representation with an indication of binaural sound in accordance with an example embodiment.

FIG. 5B shows a graphical representation 500B with an indication 510B. The indication includes a pointer or arrow having one end near or adjacent to eyes of the head of the graphical representation, and another end of the arrow points to a location in empty space (marked with an "X") that is next to one side of the head or the face of the graphical representation. This location at the "X" indicates where binaural sound will externally localize to the listener. The arrow also indicates to the listener to look in this direction since this direction is where the sound will externally localize once played. The indication thus shows the listener which direction to look or to face so the listener looks at the SLP when the binaural sound activates and plays to the listener.

Consider an example in which the graphical representation 500B displays through a HMD that the listener wears. The graphical representation does not initially display the indication 510B. Binaural sound will externally localize at a SLP having spherical coordinate location (1.0, 0.0°, −30°) with respect to the head of the listener as an origin. The sound is about to play, but the listener is looking in a different direction, such as looking at an object at (3.0, 10°, +45°). The listener is thus not current looking at or facing the SLP. In response, the HMD flashes the indication 510B on the display. The indication informs the listener that binaural sound is about to play. The indication also informs the listener to move his or her head in a direction show by the arrow since the sound will externally localize. The listener moves his or her head until the "X" is in his or her field-of-view. When this occurs, the HMD removes the indication 510B and plays the binaural sound as an animated 3D VR talking human character.

Figure 5C:
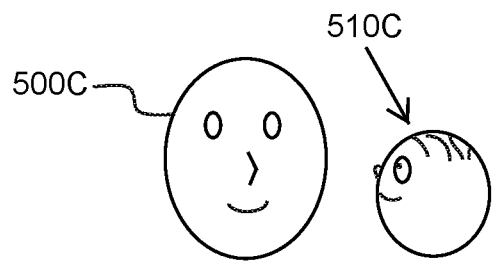
FIG. 5C is a graphical representation with an indication of binaural sound in accordance with an example embodiment.

FIG. 5C shows a graphical representation 500C with an indication 510C shown as head of a person. The indication and the graphical representation together show where the binaural sound will externally localize to the listener before or while the sound plays to the listener.

Consider an example in which a first user and a second user talk or exchange talking graphical representations during an electronic communication. The first user sends the second user a talking emoji shown as 500C which displays to the second user on a HPED. This emoji is an animated head that looks like or represents the first user. So, the face of the first user appears on the display of the HPED of the second user and faces the second user as shown in FIG. 5C. The indication 510C also appears on this display and represents the head of the second user. So, the second users sees himself or herself (indication 510C) talking to the first user (graphical representation 500C). The relative position of graphical representation 500C to indication 510C clearly shows that the first user is located in front of and to the left of the second user. In other words, the relative position of the two heads on the display of the HPED show where the SLP will be for the second user.

Figure 5D:
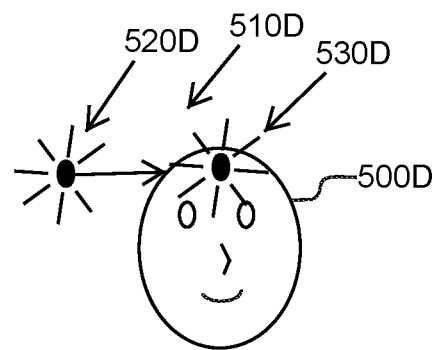
FIG. 5D is a graphical representation with an indication of binaural sound in accordance with an example embodiment.

FIG. 5D shows a graphical representation 500D with an indication 510D shown as source of binaural sound (a black dot with lines emanating from the black dot). As shown with an arrow, the source of binaural sound moves from a first location 520D outside a head of a person to a second location 530D inside a head of the person.

The indication 510D provides the listener with a variety of different valuable information. Consider the example in which the graphical representation 500D represents or symbolizes the head of the listener and is shown on a display of an HPED to the listener. First, the indication shows the listener that the sound will be binaural sound since the location 520D is physically located outside of the head of the listener. Second, the indication shows a location of where this binaural sound will initially localize to the listener. As shown, the binaural sound initially has a SLP to a right side of the face of the listener. The indication shows transition or movement of the binaural sound. The SLP starts at 520D and moves along the arrow to 530D. Here, the sound initially localizes as binaural sound and then moves to internally localize as stereo or mono sound.

Figure 5E:
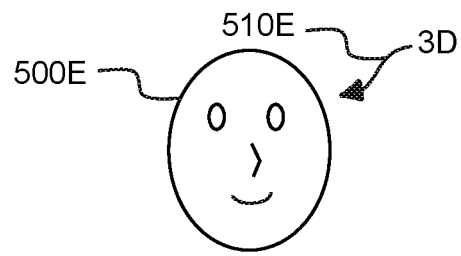
FIG. 5E is a graphical representation with an indication of binaural sound in accordance with an example embodiment.

FIG. 5E shows a graphical representation 500E with an indication 510E that includes a curved pointer or arrow. One end of the arrow points to the head or ears of the face of the graphical representation, and another end of the arrow includes a "3D" that indicates three-dimensional sound.

The indication 510E shows the listener that the sound will or is localizing in binaural sound. The indication also a direction to the source of the sound that is located at the "3D." Furthermore, a size of the "3D" can indicate a distance to the source of the sound. For example, different font sizes represent different distances. For instance, a "3D" with a larger size indicates the source of sound is closer than a "3D" with a smaller size.

Figure 5F:
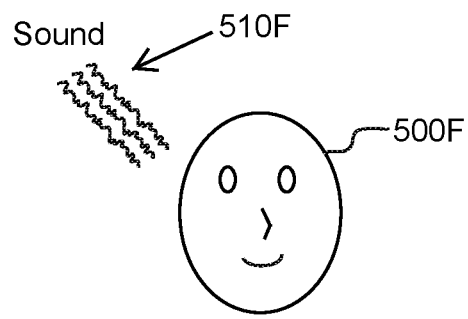
FIG. 5F is a graphical representation with an indication of binaural sound in accordance with an example embodiment.

FIG. 5F shows a graphical representation 500F with an indication 510F that shows the sound will externally localize to the listener as binaural sound. The indication includes the word "Sound" and sound waves entering from one side of the head of the graphical representation.

Consider an example in which the graphical representation 500F represents or symbolizes the head of the listener. In this instance, the source of sound originates from a right side located above the head of the listener.

Figure 5G:
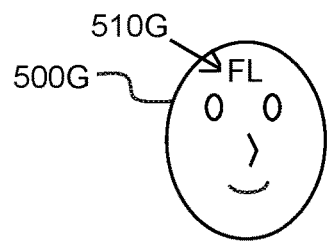
FIG. 5G is a graphical representation with an indication of binaural sound in accordance with an example embodiment.

FIG. 5G shows a graphical representation 500G with an indication 510G that shows the sound will externally localize to the listener as binaural sound. The indication includes the acronym or letters "FL" that stand for "front left." Based on this indication, the listener expects the source of sound to be in front of the face of the listener and to his or her left.

The location of the source of binaural sound can appear inside the body of the graphical representation with words, text, symbols, images, or other indicia that indicate a direction and/or distance to the source of the sound. For example, instead of "FL" the indication includes a compass heading (such as North, South, East, or West) or a coordinate location (such as coordinate location in rectangular coordinates, polar coordinates, or spherical coordinates).

Figure 5H:
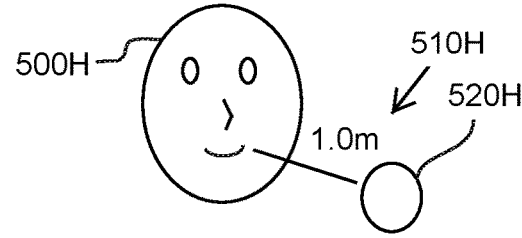
FIG. 5H is a graphical representation with an indication of binaural sound in accordance with an example embodiment.

FIG. 5H shows a graphical representation 500H with an indication 510H. The indication includes a SLP or source of sound 520H with respect to the graphical representation 510H. The indication shows a distance (1.0 meter) from the graphical representation to the source of sound. This distance shows the listener that the binaural sound will externally localize one meter away from the head of the listener.

In an example embodiment, the indication remains displayed with the graphical representation. For instance, while the graphical representation displays to the listener, the indication simultaneously displays to the listener. In another example embodiment, the indication displays for a temporary period of time with the graphical representation. For instance, the indication initially displays with the graphical representation to notify or inform the user of the existence and location of the source of the binaural sound. The indication then disappears while the graphical representation continues to display to the listener while the sound plays to the listener.

Figure 5I:
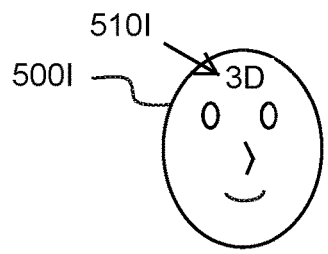
FIG. 5I is a graphical representation with an indication of binaural sound in accordance with an example embodiment.

FIG. 5I shows a graphical representation 500I with an indication 510I that shows the sound will externally localize to the listener as binaural sound. The indication includes the acronym or letters "3D" that stand for three-dimensional. Based on this indication, the listener expects the sound to be 3D sound or binaural sound that externally localizes to the listener.

Figure 5J:
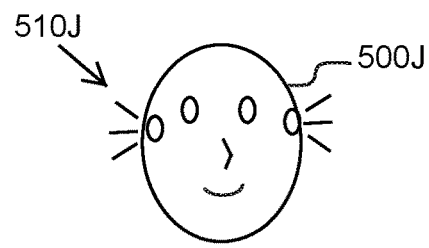
FIG. 5J is a graphical representation with an indication of binaural sound in accordance with an example embodiment.

FIG. 5J shows a graphical representation 500J with an indication 510J that shows the face with ears and sound (shown as three lines) emanating into the ears. This information informs the listener to wear headphones and informs the listener that sound is or will be binaural sound that externally localizes away from the head of the listener.

Figure 5K:
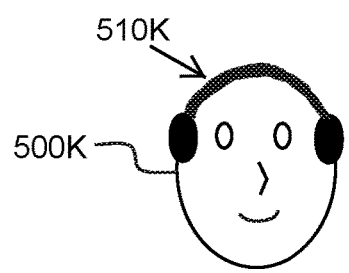
FIG. 5K is a graphical representation with an indication of binaural sound in accordance with an example embodiment.

FIG. 5K shows a graphical representation 500K with an indication 510K that includes headphones on the head of the face of the graphical representation. This indication informs the listener to wear or don headphones before listening to the sound.

Consider an example in which a first user sends a second user a 3D image that talks to the second user. When the second user activates the 3D image, a sound clip plays to the listener as binaural sound that externally localizes away from the head of the second user. The 3D image is or represents the first user. For instance, this image looks like or resembles the first user. This 3D image includes the first user wearing headphones. When the second user sees the image of the first user wearing headphones, the second user is reminded or instructed to wear headphones before listening to the sound clip. When the user puts on headphones and the sound clip begins to play, the headphones disappear from the 3D image.

Figure 5L:
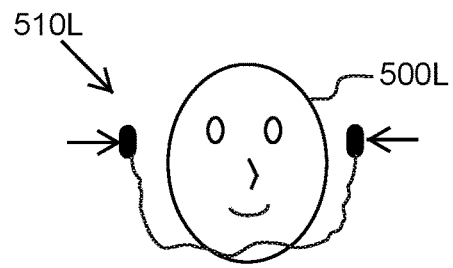
FIG. 5L is a graphical representation with an indication of binaural sound in accordance with an example embodiment.

FIG. 5L shows a graphical representation 500L with an indication 510L that instructs a listener to wear earphones or earbuds before listening to the sound associated with the graphical representation. This indication informs the listener to wear or don headphones before listening to the sound. Specifically, the indication shows the graphical representation putting on earphones or shows earphones being placed on the head of the graphical representation. This information reminds or instructs the listener to also put on earphones.

Consider an example in which a display of user simultaneously displays many graphical representations. Graphical representations with indications indicating 3D sound or binaural sound quickly show the user which ones of the graphical representations are in binaural sound or will play as binaural sound. Those graphical representations without such an indication are in stereo or mono sound or will play as stereo or mono sound. Providing such indications with emojis, for example, enables a listener to quickly visually determine a format of emojis with sound (e.g., a format of stereo or mono sound versus a format of binaural sound).

Figure 5M:
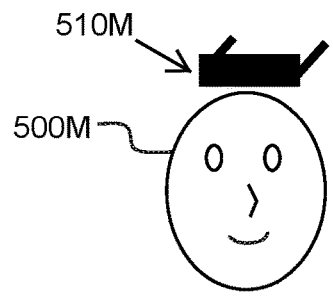
FIG. 5M is a graphical representation with an indication of binaural sound in accordance with an example embodiment.

FIG. 5M shows a graphical representation 500M with an indication 510M that instructs a listener to wear a head mounted display (HMD) or other wearable device (e.g., a smartphone that attaches to the head of the listener via a head mount). This indication informs the listener to wear or don the HMD before listening to the sound. Specifically, the indication shows the graphical representation putting on the HMD. This information reminds or instructs the listener to also put on his or her HMD.

Figure 5N:
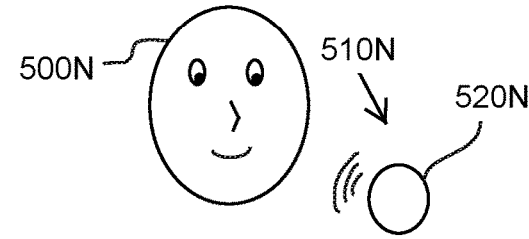
FIG. 5N is a graphical representation with an indication of binaural sound in accordance with an example embodiment.

FIG. 5N shows a graphical representation 500N with an indication 510N shown as a source of the binaural sound. The indication includes a circle that represents the source of sound or SLP from where the listener will hear the binaural sound. Three lines indicate sound emanating from the circle to the listener.

The graphical representation 500N also includes eyes that are looking toward the indication 520N. The direction of gaze of the graphical representation shows the listener the direction of the source of sound.

Consider an example in which two users send emojis with 3D sound to each other during an electronic communication. The graphical representation 500N is a 3D talking emoji of the first user that was sent to the HPED of the second user. Before activating the emoji, the second user sees eyes of the graphical representation looking forward but to one side. This same side includes source of sound emitting sound. This information instructs the second user that the sound will be 3D sound or binaural sound. The information also instruct the second user of the location where the second user will hear the sound. When the second user activates the emoji, its mouth moves and begins to talk to the second user. The indication 520N vanishes from the display, and the second user sees the graphical representation 500N talking.

Figure 5O:
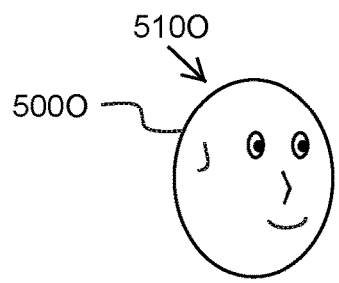
FIG. 5O is a graphical representation with an indication of binaural sound in accordance with an example embodiment.

FIG. 5O shows a graphical representation 500O with an indication 510O shown as eyes and face of the graphical representation looking in a particular direction. This direction indicates the location of the binaural sound to the listener.

The face of the graphical representation 500O is rotated to the right from the point-of-view of the listener. This information instructs the listener that the listener should look to his or her right. Alternatively or additionally, this information instructs the listener that the source of sound or SLP will be to the right of the head of the listener.

FIG. 5O shows that the looking direction or gaze of the eyes can indicate the location of the source of sound or SLP. The direction of the face or looking direction of the face can also indicate this information. For example, the head of the graphical representation 500O rotates to a right to indicate the SLP will be to the right, rotates left to indicate the SLP will be to the left, rotates up to indicate the SLP will be up, etc.

The graphical representation 500O also includes eyes that are looking toward the indication 520O. The direction of gaze of the graphical representation shows the listener the direction of the source of sound.

Figure 5P:
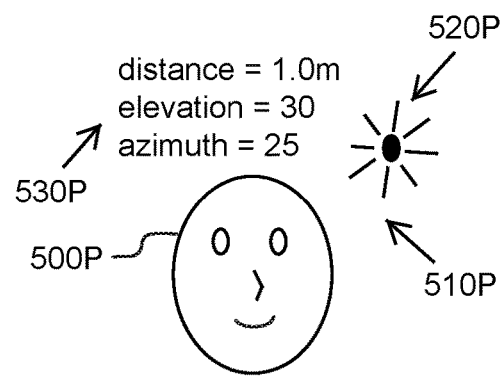
FIG. 5P is a graphical representation with an indication of binaural sound in accordance with an example embodiment.

FIG. 5P shows a graphical representation 500P with an indication 510P that includes a source of sound or SLP 520P and information 530P about the location of the SLP. The information shows a coordinate location where the SLP will or does exist for the listener. This SLP has a spherical coordinate location of (1.0 m, 30°, 25°).

In FIG. 5P, the indication 510P shows the precise or exact coordinate location where the sound will play to the listener. The SLP 520P is also positioned at this same location. So both the coordinate location (shown at 530P) and the SLP 520P show the listener where the sound will play to the listener.

Figure 5Q:
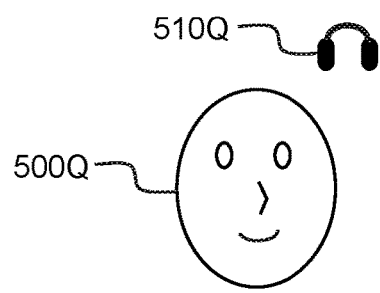
FIG. 5Q is a graphical representation with an indication of binaural sound in accordance with an example embodiment.
Figure 5R:
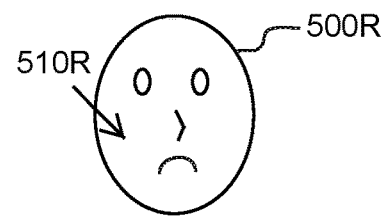
FIG. 5R is a graphical representation with an indication of binaural sound in accordance with an example embodiment.

FIG. 5Q shows a graphical representation 500Q with an indication 510Q that includes headphones. These headphones serve one or more of several functions. First, the headphones instruct the listener to put on headphones. Second, the headphones instruct the listener that the sound the listener will hear will be binaural sound since proper external sound localization of binaural sound requires headphones or earphones. Third, the headphones show a location where the binaural sound will externally localize to the listener. As shown in FIG. 5Q, the sound will originate above and in front of the listener since this is the location of the headphones with respect to the head of the graphical representation.

FIG. 5R shows a graphical representation 500R with an indication 510R that includes a facial expression of the graphical representation. The facial expression (shown as a sad face) indicates to the listener that the listener is not ready to hear the sound associated with the graphical representation.

Consider an example in which emojis with sad faces represent that the listener is not wearing headphones or earphones. When the listener dons headphones or earphones, the emoji with the sad face changes to a happy face. This change and the happy face signify to the listener that the listener is ready to hear the sound as binaural sound.

Figure 6:
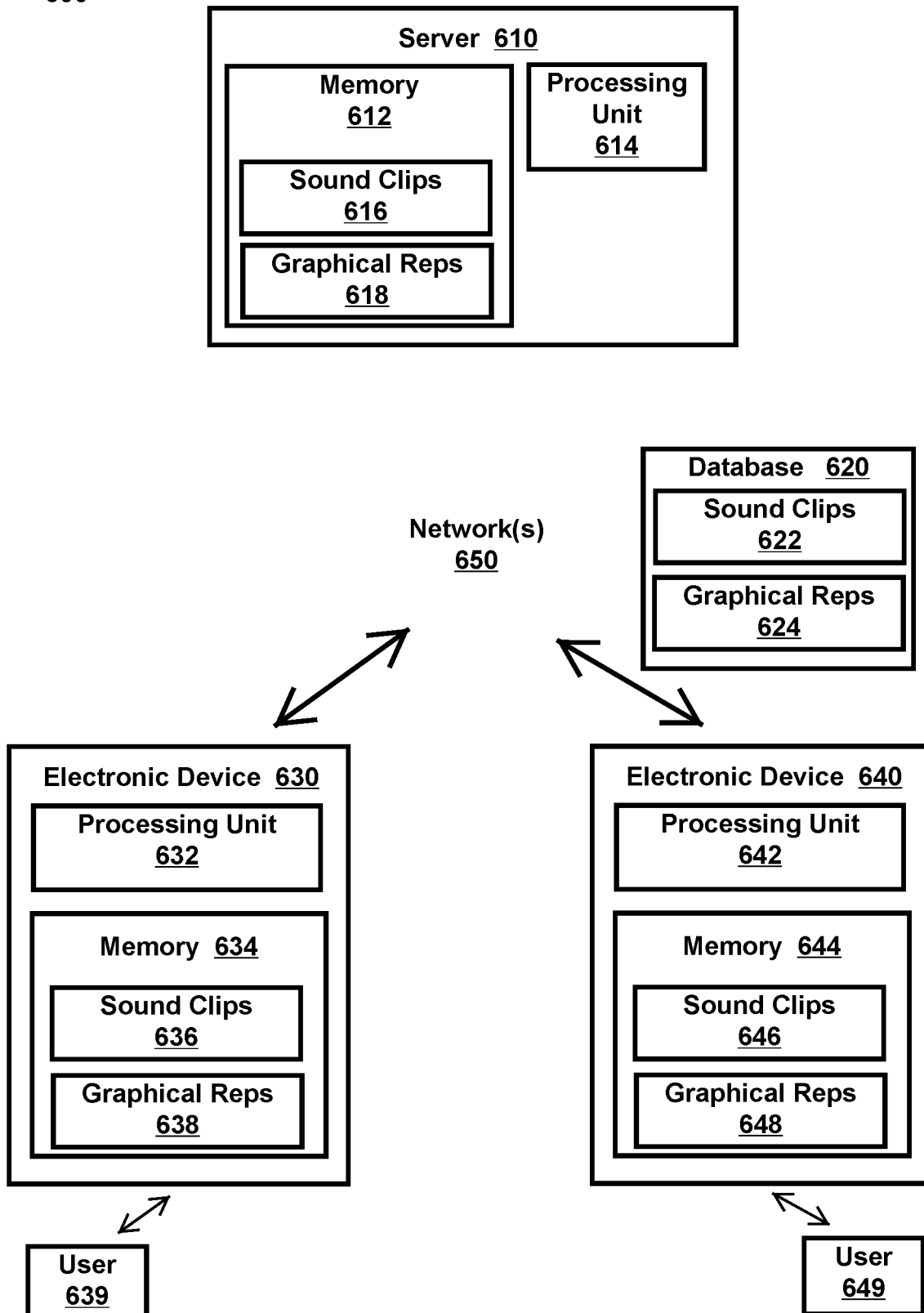
FIG. 6 is an example computer system in accordance with an example embodiment.

FIG. 6 is an example computer system 600 in accordance with an example embodiment.

The computer system 600 includes one or more of a server 610, a database 620, an electronic device 630, and an electronic device 640 in communication over one or more networks 650. User 639 is with or uses electronic device 630, and user 649 is with or uses electronic device 640. For illustration, a single server 610, a single database 620, two electronic devices 630 and 640, and two users 639 and 649 are shown, but example embodiments can include a plurality of servers, databases, electronic devices, and users.

Server 610 includes a memory 612 and a processing unit 614. The memory 621 includes sound clips 616 and graphical representations or graphical reps 618 of the sound clips. The server 610 couples to or communicates with the database 620 that includes sound clips 622 and graphical representations or graphical reps 624.

Electronic device 630 includes a processing unit 632 and memory 634 with sound clips 636 and graphical representations or graphical reps 638. User 639 interacts with or uses electronic device 630.

Electronic device 640 includes a processing unit 642 and memory 644 with sound clips 646 and graphical representations or graphical reps 648. User 649 interacts with or uses electronic device 630.

Figure 7:
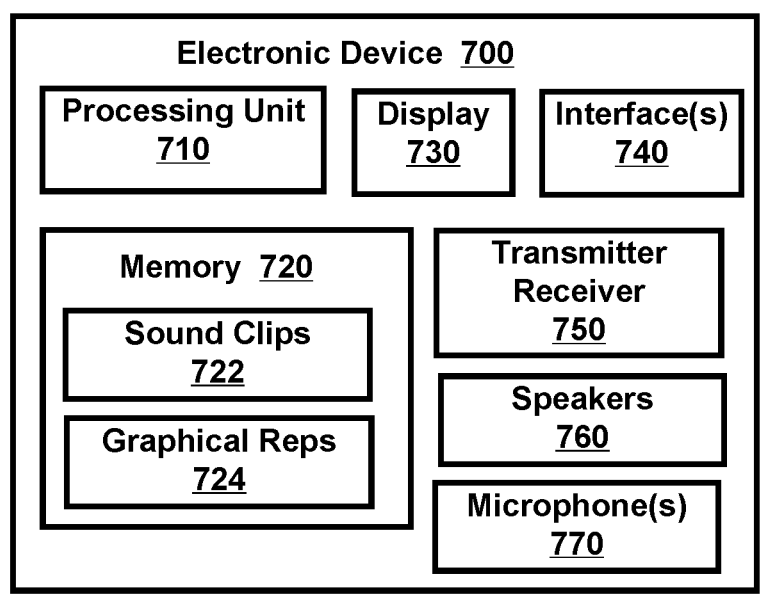
FIG. 7 is an example of an electronic device in accordance with an example embodiment.

FIG. 7 is an example of an electronic device 700 in accordance with an example embodiment.

The electronic device 700 includes a processor or processing unit 710, memory 720 with sound clips 722 and graphical representations or graphical reps 724, a display 730, one or more interfaces 740, a wireless transmitter/receiver 750, speakers 760, and one or more microphones 770.

Memory includes computer readable medium (CRM). Examples of an interface include, but are not limited to, a network interface, a graphical user interface, a natural language user interface, a natural user interface, a phone control interface, a reality user interface, a kinetic user interface, a touchless user interface, an augmented reality user interface, and/or an interface that combines reality and virtuality.

Sound clips include sound files, sounds, recorded messages (such as voice messages or other recorded sound), computer-generated sounds, and other sound discussed herein. For example, users can record, exchange, and/or transmit sound clips or sounds. These sound include sending streaming sounds or sounds in real-time during an electronic communication.

The processor or processing unit includes a processor and/or a digital signal processor (DSP). For example, the processing unit includes one or more of a central processing unit, CPU, digital signal processor (DSP), microprocessor, microcontrollers, field programmable gate arrays (FPGA), application-specific integrated circuits (ASIC), etc. for controlling the overall operation of memory (such as random access memory (RAM) for temporary data storage, read only memory (ROM) for permanent data storage, and firmware).

Consider an example embodiment in which the processing unit includes both a processor and DSP that communicate with each other and memory and perform operations and tasks that implement one or more blocks of the flow diagram discussed herein. The memory, for example, stores applications, data, programs, sound clips, algorithms (including software to implement or assist in implementing example embodiments) and other data.

For example, a processor or DSP executes a convolving process with the retrieved HRTFs or HRIRs (or other transfer functions or impulse responses) to process sound clips so that the sound is adjusted, placed, or localized for a listener away from but proximate to the head of the listener. For example, the DSP converts mono or stereo sound to binaural sound so this binaural sound externally localizes to the user. The DSP can also receive binaural sound and move its localization point, add or remove impulse responses (such as RIRs), and perform other functions.

For example, an electronic device or software program convolves and/or processes the sound captured at the microphones of an electronic device and provides this convolved sound to the listener so the listener can localize the sound and hear it. The listener can experience a resulting localization externally (such as at a sound localization point (SLP) associated with near field HRTFs and far field HRTFs) or internally (such as monaural sound or stereo sound).

The memory stores HRTFs, HRIRs, BRTFs, BRIRs, RTFs, RIRs, or other transfer functions and/or impulse responses for processing and/or convolving sound. The memory can also store instructions for executing one or more example embodiments. Further, the memory can store the sound, graphical representations, and other information and instructions discussed herein.

The electronic device provides sound to the users through one or more speakers. Alternatively or in addition to the speakers, the electronic device can communicate with headphones, earphones, earbuds, bone conduction devices, or another electronic device that provides sound to the user.

The networks include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices couple together via one or more wires, such as a direct wired-connection. As another example, electronic devices communicate directly through a wireless protocol, such as Bluetooth, near field communication (NFC), or other wireless communication protocol.

By way of example, a computer and an electronic device include, but are not limited to, handheld portable electronic devices (HPEDs), wearable electronic glasses, electronic or smart watches, wearable electronic devices (WEDs), smart earphones or hearables, electronic devices with cellular or mobile phone capabilities or subscriber identification module (SIM) cards, desktop computers, servers, portable computers (such as tablet and notebook computers), smartphones, head mounted displays (HMDs), optical head mounted displays (OHMDs), headphones, and other electronic devices with a processor or processing unit, a memory, a DSP.

Example embodiments are not limited to HRTFs but also include other sound transfer functions and sound impulse responses including, but not limited to, head related impulse responses (HRIRs), room transfer functions (RTFs), room impulse responses (RIRs), binaural room impulse responses (BRIRs), binaural room transfer functions (BRTFs), headphone transfer functions (HPTFs), etc.

Example embodiments can be executed with one or more integrated circuits that are specifically customized, designed, or configured to execute one or more blocks discussed herein. For example, the electronic devices include a specialized or custom processor or microprocessor or semiconductor intellectual property (SIP) core or digital signal processor (DSP) with a hardware architecture optimized for convolving sound and executing one or more example embodiments.

Consider an example in which the HPED (including headphones) includes a customized or dedicated DSP that executes one or more blocks discussed herein (including processing and/or convolving sound into binaural sound for sound clips). Such a DSP has a better power performance or power efficiency compared to a general-purpose microprocessor and is more suitable for a HPED or WED due to power consumption constraints of the HPED or WED. The DSP can also include a specialized hardware architecture, such as a special or specialized memory architecture to simultaneously fetch or pre-fetch multiple data and/or instructions concurrently to increase execution speed and sound processing efficiency and to quickly correct errors while sound externally localizes to the user. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller. The DSP can also prefetch sound clips and other sound from memory to expedite convolution.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

Consider another example in which sound clips, graphical representations, and/or HRTFs (or other transfer functions or impulse responses) are stored or cached in the DSP memory or local memory relatively close to the DSP to expedite binaural sound processing.

As used herein, an "emoji" is a graphical representation that includes images, symbols, or icons sent between users in electronic communications (such as text messages, e-mail, and social media) to express an emotional attitude of the writer, convey information, or communicate an message. Emojis can provide sound when activated.

As used herein, "headphones" or "earphones" include a left and right over-ear ear cup, on-ear pad, or in-ear monitor (IEM) with one or more speakers or drivers for a left and a right ear of a wearer. The left and right cup, pad, or IEM may be connected with a band, connector, wire, or housing, or one or both cups, pads, or IEMs may operate wirelessly being unconnected to the other. The drivers may rest on, in, or around the ears of the wearer, or mounted near the ears without touching the ears.

As used herein, the word "proximate" means near. For example, binaural sound that externally localizes away from but proximate to a user localizes within three meters of the head of the user.

As used herein, a "user" or a "listener" is a person (i.e., a human being). These terms can also be a software program (including an IPA or IUA), hardware (such as a processor or processing unit), an electronic device or a computer (such as a speaking robot or avatar shaped like a human with microphones in its ears or about six inches apart).

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

What is claimed is:

1. A method executed by a wearable electronic device (WED) that enables a listener to know in advance of activating an emoji where binaural sound of an emoji will externally localize to the listener, the method comprising:
   displaying, with a display of the WED, the emoji that when activated plays the binaural sound to the listener and that has a body with an indication showing a location where the binaural sound will externally localize away from a head of the listener when the listener activates the emoji.

2. The method of claim 1 further comprising:
   playing, by the WED and through headphones or earbuds when the listener activates the emoji, the binaural sound that externally localizes away from the head of the listener at an augmented reality (AR) or virtual reality (VR) image of the emoji.

3. The method of claim 1 further comprising:
   receiving, at the WED and from a user during an electronic communication between the user and the listener, the emoji and sound being in one of stereo sound or mono sound; and
   expediting playing of the sound to the listener by processing, with a digital signal processor (DSP) in the WED, the sound with head-related transfer functions (HRTFs) before the listener activates the emoji to play the sound, wherein processing the sound with the DSP changes the sound from the one of the stereo sound or the mono sound to the binaural sound.

4. The method of claim 1, wherein the emoji includes a head of an animated character or an animated person, and the method further comprising:
   rotating the head of the emoji to provide the indication such that the head of the emoji rotates to face a direction where the binaural sound will externally localize to the listener when the listener activates the emoji.

5. The method of claim 1 further comprising:
   displaying, with the display of the WED, instructions to the listener to wear headphones or earphones while listening to the binaural sound, such instructions being displaying as headphones that flash on and off.

6. The method of claim 1, wherein the indication includes an arrow pointing to the location where the binaural sound will externally localize away from the head of the listener when the listener activates the emoji.

7. The method of claim 1, wherein the indication is part of a body of the emoji and visually shows the listener a direction to the location where the binaural sound will externally localize to the listener.

8. A non-transitory computer-readable storage medium that stores instructions a wearable electronic device (WED) executes, the method comprising:
   assisting a listener in knowing where binaural sound from an emoji will externally localize to the listener when the listener activates the emoji by displaying, with a display of the WED, the emoji with an indication of a sound localization point (SLP) where the binaural sound from the emoji will externally localize to the listener when the listener activates the emoji to hear the binaural sound.

9. The non-transitory computer-readable storage medium of claim 8, wherein the indication includes text of "3D".

10. The non-transitory computer-readable storage medium of claim 8 further comprising:
    displaying the head of the emoji with eyes that look in a direction of the SLP such that the eyes provide the indication where the binaural sound from the emoji will externally localize to the listener when the listener activates the emoji to hear the binaural sound, wherein the emoji includes two-dimensional (2D) and three-dimensional (3D) animojis.

11. The non-transitory computer-readable storage medium of claim 8 further comprising:
    displaying the emoji with a head that is rotated to look in a direction of the SLP such that the head rotated toward the direction provides the indication where the binaural sound from the emoji will externally localize to the listener when the listener activates the emoji to hear the binaural sound.

12. The non-transitory computer-readable storage medium of claim 8 further comprising:
    displaying a head of the emoji wearing headphones that change brightness to instruct the listener to wear headphones before activating the emoji to listen to the binaural sound.

13. The non-transitory computer-readable storage medium of claim 8, wherein the indication visually shows the listener that the binaural sound from the emoji will externally localize to the SLP that is located in front of and on a right side of a head of the listener.

14. The non-transitory computer-readable storage medium of claim 8, wherein the indication visually shows the listener that the binaural sound from the emoji will externally localize to the SLP that is located in front of and on a left side of a head of the listener.

15. A method executed by a wearable electronic device (WED), the method comprising:
    enabling a listener to know in advance of activating an emoji that sound of the emoji will externally localize as binaural sound as opposed to stereo sound or mono sound by displaying, with a display of the WED, the emoji as a person or a character that includes an indication visually informing the listener that the sound of the emoji will externally localize as the binaural sound as opposed to the stereo sound or the mono sound when the listener activates the emoji.

16. The method of claim 15 further comprising:
    enabling the listener to know in advance of activating the emoji a location where the sound of the emoji will externally localize as the binaural sound by rotating a head of the person or the character to point in a direction of the location where the sound of the emoji will externally localize as the binaural sound when the listener activates the emoji.

17. The method of claim 15, wherein the indication includes headphones that flash on and off on a head of the person or the character such that flashing of the headphones instructs the listener to wear headphones before activating the emoji and listening to the binaural sound.

18. The method of claim 15, wherein the indication is attached to or forms part of a head of the person or the character as opposed to being separate from the head of the person or the character.

19. The method of claim 15 further comprising:
    receiving, at a wireless receiver of the WED and over a wireless network, the sound of the emoji as the stereo sound or the mono sound; and
    expediting playing of the sound to the listener by processing, with a digital signal processor in the WED, the sound with head-related transfer functions (HRTFs) after receiving the sound at the wireless receiver but before the listener activates the emoji so the sound is not required to be processed with the HRTFs at a point in time when the listener activates the emoji to hear the sound.

20. The method of claim 15, wherein the emoji is a three-dimensional (3D) image that talks to the listener, and the sound externally localizes as the binaural sound in empty space at the 3D image one meter away from a head of the listener at azimuth coordinates of $15° \leq \theta \leq 60°$.

* * * * *